US012647767B2

(12) United States Patent (10) Patent No.: US 12,647,767 B2
Godin et al. (45) Date of Patent: Jun. 2, 2026

(54) METHOD AND APPARATUS FOR OBTAINING PARAMETERS OF NODES IN A MOBILE COMMUNICATION SYSTEM

(71) Applicant: Nokia Technologies Oy, Espoo (FI)

(72) Inventors: Philippe Godin, Massy (FR); Bruno Landais, Lannion (FR); Laurent Thiebaut, Massy (FR); Ömer Bulakci, Munich (DE); Subramanya Chandrashekar, Bangalore (IN); Jens Gebert, Ulm (DE)

(73) Assignee: Nokia Technologies Oy, Espoo (FI)

( * ) Notice: Subject to any disclaimer, the term of this patent is extended or adjusted under 35 U.S.C. 154(b) by 426 days.

(21) Appl. No.: 18/258,186

(22) PCT Filed: Dec. 18, 2020

(86) PCT No.: PCT/EP2020/087152
§ 371 (c)(1),
(2) Date: Jun. 16, 2023

(87) PCT Pub. No.: WO2022/128123
PCT Pub. Date: Jun. 23, 2022

(65) Prior Publication Data
US 2024/0056788 A1 Feb. 15, 2024

(51) Int. Cl.
*H04W 4/02* (2018.01)
*H04W 8/08* (2009.01)
*H04W 76/10* (2018.01)
*H04W 88/02* (2009.01)
*H04W 88/06* (2009.01)
*H04W 92/02* (2009.01)

(52) U.S. Cl.
CPC ..................................... *H04W 8/08* (2013.01)

(58) Field of Classification Search
CPC ......... H04W 8/08; H04W 48/16; H04W 8/22;
H04W 60/00
USPC ...................................................... 455/422.1
See application file for complete search history.

(56) References Cited

U.S. PATENT DOCUMENTS

2019/0230556 A1 7/2019 Lee
2020/0154351 A1 * 5/2020 Baek ..................... H04W 16/14
2020/0396678 A1 12/2020 Lee et al.
(Continued)

FOREIGN PATENT DOCUMENTS

WO 2020/030287 A1 2/2020

OTHER PUBLICATIONS

IP.com search history (Year: 2025).*
(Continued)

*Primary Examiner* — Moustapha Diaby
(74) *Attorney, Agent, or Firm* — Lippes Mathias LLP

(57) ABSTRACT

A method, apparatus and computer program is described comprising: receiving a first register request from a first node of a mobile communication system at a network repository function of a mobile communication system, wherein the first register request registers parameters or capabilities of the first node in the network repository function to enable the network repository function to provide information relating to said parameters or capabilities to a second node of the mobile communications system, wherein at least one of the first and the second node is an access node of the mobile communication system.

8 Claims, 10 Drawing Sheets

(56) References Cited

U.S. PATENT DOCUMENTS

2022/0150797 A1*  5/2022  Yin ................... H04M 15/8228
2023/0370830 A1*  11/2023 Sander ................. H04W 76/10

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133.
"3rd Generation Partnership Project; Technical Specification Group Services and System Aspects; System architecture for the 5G System (5GS); Stage 2 (Release 16)", 3GPP TS 23.501, V16.4.0, Mar. 2020, pp. 1-430.
"3rd Generation Partnership Project; Technical Specification Group Radio Access Network; NG-RAN; Xn application protocol (XnAP) (Release 16)", 3GPP TS 38.423, V16.3.0, Sep. 2020, pp. 1-451.
International Search Report and Written Opinion received for corresponding Patent Cooperation Treaty Application No. PCT/EP2020/087152, dated Sep. 23, 2021, 16 pages.
"Solution 35 update", 3GPP TSG-SA WG2 Meeting #140e, S2-2006264, Agenda: 8.1, Lenovo, Aug. 19-Sep. 2, 2020, 9 pages.

* cited by examiner

METHOD AND APPARATUS FOR OBTAINING PARAMETERS OF NODES IN A MOBILE COMMUNICATION SYSTEM

RELATED APPLICATION

The present application is a National Phase Entry under of International Patent Application No. PCT/EP2020/087152, filed Dec. 18, 2020, and entitled "MOBILE COMMUNI-CATION SYSTEM," the entire disclosure of which is incor-porated herein by reference in its entirety for all purposes.

FIELD

The present specification relates to mobile communica-tion systems.

BACKGROUND

A node of a mobile communication system may wish to obtain parameters of other nodes of the mobile communi-cation system. There remains a need for further develop-ments in this field.

SUMMARY

In a first aspect, this specification describes an apparatus (such as a network repository function of a mobile commu-nication system), comprising means for performing: receiv-ing a first register request from a first node (e.g. a RAN) of a mobile communication system at a network repository function of a mobile communication system (e.g. as part of a service-based architecture), wherein the first register request registers parameters or capabilities (such as cell configuration, cell status parameters, cell load, data analytics etc.) of the first node in the network repository function to enable the network repository function to provide informa-tion relating to said parameters or capabilities to a second node of the mobile communications system, wherein at least one of the first and the second node is an access node of the mobile communication system.

Some example embodiments further comprise means for performing: receiving a discovery request from the second node of the mobile communication system at the network repository function, wherein the second node requests to discover parameters or capabilities of the first node; and sending a discovery response to the second node with the parameters or capabilities of the first node.

Some example embodiments further comprise means for performing: receiving a subscription request from the sec-ond node of the mobile communication system at the network repository function, wherein the subscription request requests that the second node be notified about a change of parameters or capabilities of the first node; receiving a register update request from the first node at the network repository function, wherein the register update request registers updates to the node parameters or capa-bilities of the first node; and sending a notification to the second node in the event that at least one of said identified parameters or capabilities of the first node is updated.

Some example embodiments further comprise means for performing: triggering (e.g. at the network repository func-tion) the use of said register update request to register update(s) to said node parameters or capabilities. The means for performing triggering the use of said register update request to register updates to said node parameters or capabilities may comprise identifying one or more of: a change in a list of network slice information; a change in cell load; a change in data analytics; and a change in Access and Mobility Management Function characteristics.

In a second aspect, this specification describes an appa-ratus (such as a first node of a mobile communication system) comprising means for performing at least one of: sending a first register request to a network repository function (NRF) of a mobile communication system to reg-ister node parameters or capabilities of a first node of the mobile communication system in the network repository function to enable the network repository function to pro-vide information relating to said parameters or capabilities to a second node of the mobile communications system; and sending a register update request to the network repository function to register updates of the first node parameters or capabilities in said network repository function, to enable the network repository function to provide information relating to said updated parameters or capabilities to the second node of the mobile communications system, wherein at least one of the first and the second node is an access node of the mobile communication system.

Some example embodiments further comprise means for performing: triggering (e.g. at said first node, although the trigger could occur elsewhere) the use of said register update request to register update(s) to said node parameters or capabilities. The means for performing triggering the use of said register update request to register updates to said node parameters or capabilities may comprise identifying one or more of: a change in a list of network slice information; a change in cell load; a change in data analytics; and a change in Access and Mobility Management Function (AMF) char-acteristics.

In a third aspect, this specification describes an apparatus (such as a second node of a mobile communication system) comprising means for performing: sending a discovery request from a second node of a mobile communication system to a network repository function of the mobile communication system, wherein the second node requests to discover parameters or capabilities of a first node of the mobile communication system; and receiving a discovery response from the network repository function with the parameters or capabilities of the first node, wherein at least one of the first and the second node is an access node of the mobile communication system.

Some example embodiments further comprise means for performing: determining a need to be notified about changes of parameters or capabilities of a first node of a mobile communication system at a second node of the mobile communication system; sending a subscription request from the second node to a network repository function of the mobile communication system, wherein the subscription request identifies the first node and one or more node parameters or capabilities; and receiving a notification from the network repository function in the event that one or more of said identified parameters or capabilities of the first node are registered by the first node as having been updated, wherein at least one of the first and the second node is an access node of the mobile communication system.

In a fourth aspect, this specification describes a mobile communication system comprising a first node, a second node and a network repository function, wherein at least one of the first node and the second node is an access node of the mobile communication system and wherein: the first node comprises means for performing at least one of: sending a first register request to a network repository function of a mobile communication system to register node parameters or capabilities of a first node of the mobile communication system in the network repository function to enable the network repository function to provide information relating to said parameters or capabilities to a second node of the mobile communications system; and sending a register update request to the network repository function to register updates to the first node parameters or capabilities in said network repository function, to enable the network repository function to provide information relating to said updated parameters or capabilities to a second node of the mobile communications system, the second node comprises means for performing: determining a need to get parameters or capabilities of the first node and/or be notified about changes of parameters or capabilities of the first node; sending a subscription request from the second node to the network repository function of the mobile communication system, wherein the subscription request identifies the first node and one or more node parameters or capabilities; and receiving a notification from the network repository function in the event that one or more of said identified parameters or capabilities of the first node are registered by the first node as having been updated, and the network repository function comprises means for performing at least one of: receiving the first register request from the first node; receiving a discovery request from the second node to discover parameters or capabilities of the first node; sending a discovery response including the parameters or capabilities of the first node to the second node; receiving the subscription request from the second node; receiving the register update request from the first node; and sending the notification to the second node.

In some example embodiments of the first to fourth aspects described above, the first and the second nodes of a mobile communication system are access nodes and the first node is a neighbour node of the second node and/or the first node belongs to the same RAN Notification Area as the second access node.

In some example embodiments of the first to fourth aspects described above, one of the first and second nodes is an Access and Mobility Management Function (AMF) of the mobile communication system.

In some example embodiments of the first to fourth aspects described above, the first node is an access node of the mobile communication system and the parameters or capabilities of the first node comprise one or more of: supported public land mobile networks(s) and S-NPNs; supported tracking area identifier(s); supported CAG identifier(s); supported slices or S-NSSAI; access node characteristics; supported Radio Access Types; supported RAN-Based Notification Area; support of default radio parameters values such as default paging DRX value or extended DRX value or NBIOT specific DRX values; support of UE retention information feature; one or more of other features supported by the access node such as Wake Up Signal, Radio Access Capability identification, control plane CIoT, user plane CIoT; a load of one or more cells of the respective access node; data cell analytics; a List of Served Cells with their supported cell parameters including any of Physical Cell ID, frequency of the cell, RAN area code of the cell, Transmission Bandwidth for the uplink and or downlink direction for the cell, Intended TDD DL-UL Configuration for the cell including the information on the split between UL and DL transmission, configured TAC indication, NPN broadcast information, SSB positions in burst, NR cell PRACH configuration, CSI-RS transmission indication, UL and DL EARFCN, offset of NBIOT channel number to DL/UL EARFCN, subframe assignment, special subframe patterns, number of antenna ports, MBSFN subframe info, E-UTRA Multiband Info List, bandwidth reduce SI, Protected E-UTRA resource indication, Broadcast PLMN List; and other supported names for the node.

In some example embodiments of the first to fourth aspects described above, the first node is an Access and Mobility Management Function and the parameters or capabilities of the first node comprise one or more of: features supported by the Access and Mobility Management Function, including support of control plane CIoT, user plane CIoT, Wake Up Signal, UE retention information; ability to support of IAB nodes; radio access types supported by the Access and Mobility Management Function; supported PLMNs, supported S-NPNs, supported closed access groups, supported slices or S-NSSAIs; list of offered globally unique Access Management Identifiers; list of other system which it can connect such as EPS, UMTS, IMS, non-3GPP networks; list of interfaces it supports including N26 interface support of the Access and Mobility Management Function; an interface availability status of the Access and Mobility Management Function; and other supported names for the node.

In the example embodiments described above, the said means may comprise: at least one processor; and at least one memory including computer program code, the at least one memory and the computer program code configured, with the at least one processor, to cause the performance of the apparatus.

In a fifth aspect, this specification describes a method comprising: receiving a first register request from a first node of a mobile communication system at a network repository function of a mobile communication system, wherein the first register request registering parameters or capabilities of the first node in the network repository function to enable the network repository function to provide information relating to said parameters or capabilities to a second node of the mobile communications system, wherein at least one of the first and the second node is an access node of the mobile communication system.

In a sixth aspect, this specification describes a method comprising: sending a first register request to a network repository function of a mobile communication system to register node parameters or capabilities of a first node of the mobile communication system in the network repository function to enable the network repository function to provide information relating to said parameters or capabilities to a second node of the mobile communications system; and sending a register update request to the network repository function to register updates of the first node parameters or capabilities in said network repository function, to enable the network repository function to provide information relating to said updated parameters or capabilities to a second node of the mobile communications system, wherein at least one of the first and the second node is an access node of the mobile communication system.

In a seventh aspect, this specification describes a method comprising: sending a discovery request from a second node of a mobile communication system to a network repository function of the mobile communication system, wherein the second node requests to discover parameters or capabilities of a first node of the mobile communication system; and receiving a discovery response from the network repository function with the parameters or capabilities of the first node, wherein at least one of the first and the second node is an access node of the mobile communication system.

The fifth to seventh aspects described above may include one or more of the features of the first to third embodiments described above respectively.

In an eighth aspect, this specification describes computer-readable instructions which, when executed by computing apparatus, cause the computing apparatus to perform (at least) any method as described with reference to any one of fifth to seventh aspects.

In a ninth aspect, this specification describes a computer-readable medium (such as a non-transitory computer-readable medium) comprising program instructions stored thereon for performing (at least) any method as described with reference to any one of fifth to seventh aspects.

In a tenth aspect, this specification describes an apparatus comprising: at least one processor; and at least one memory including computer program code which, when executed by the at least one processor, causes the apparatus to perform (at least) any method as described with reference to any one of fifth to seventh aspects.

In an eleventh aspect, this specification describes a network repository function of a mobile communication system comprising: an input for receiving a first register request from a first node (e.g. a RAN) of the mobile communication system, wherein the first register request registers parameters or capabilities (such as cell configuration, cell status parameters, cell load, data analytics etc.) of the first node in the network repository function to enable the network repository function to provide information relating to said parameters or capabilities to a second node of the mobile communications system, wherein at least one of the first and the second node is an access node of the mobile communication system.

In a twelfth aspect, this specification describes an apparatus (such as a first node of a mobile communication system) comprising: a first output for sending a first register request to a network repository function (NRF) of a mobile communication system to register node parameters or capabilities of a first node of the mobile communication system in the network repository function to enable the network repository function to provide information relating to said parameters or capabilities to a second node of the mobile communications system; and a second output for sending a register update request to the network repository function to register updates of the first node parameters or capabilities in said network repository function, to enable the network repository function to provide information relating to said updated parameters or capabilities to the second node of the mobile communications system, wherein at least one of the first and the second node is an access node of the mobile communication system.

In a thirteenth aspect, this specification describes an apparatus (such as a second node of a mobile communication system) comprising: a first output for sending a discovery request to a network repository function of the mobile communication system, wherein the discovery request requests to discover parameters or capabilities of a first node of the mobile communication system; and a first input for receiving a discovery response from the network repository function with the parameters or capabilities of the first node, wherein at least one of the first and the second node is an access node of the mobile communication system.

BRIEF DESCRIPTION OF THE DRAWINGS

Example embodiments will now be described, by way of example only, with reference to the following schematic drawings, in which.

6

Figure 2:
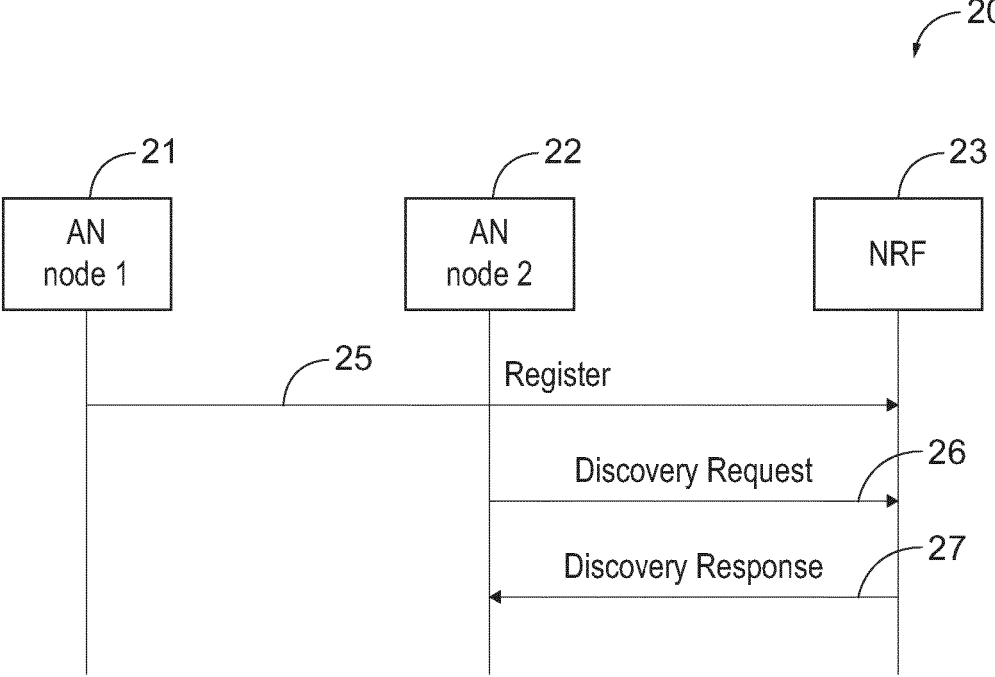
Figure 3:
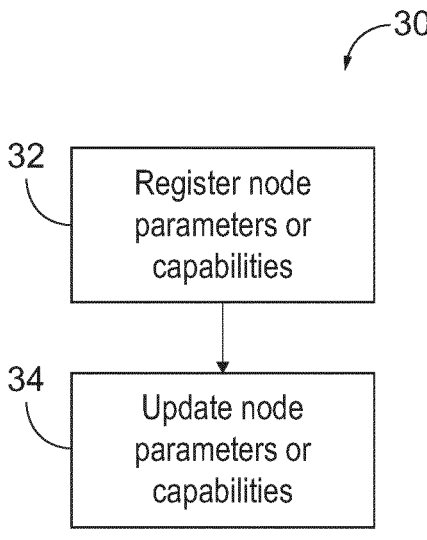
Figure 4:
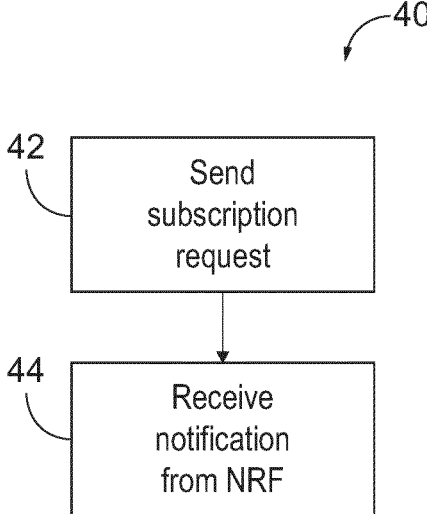
Figure 11:
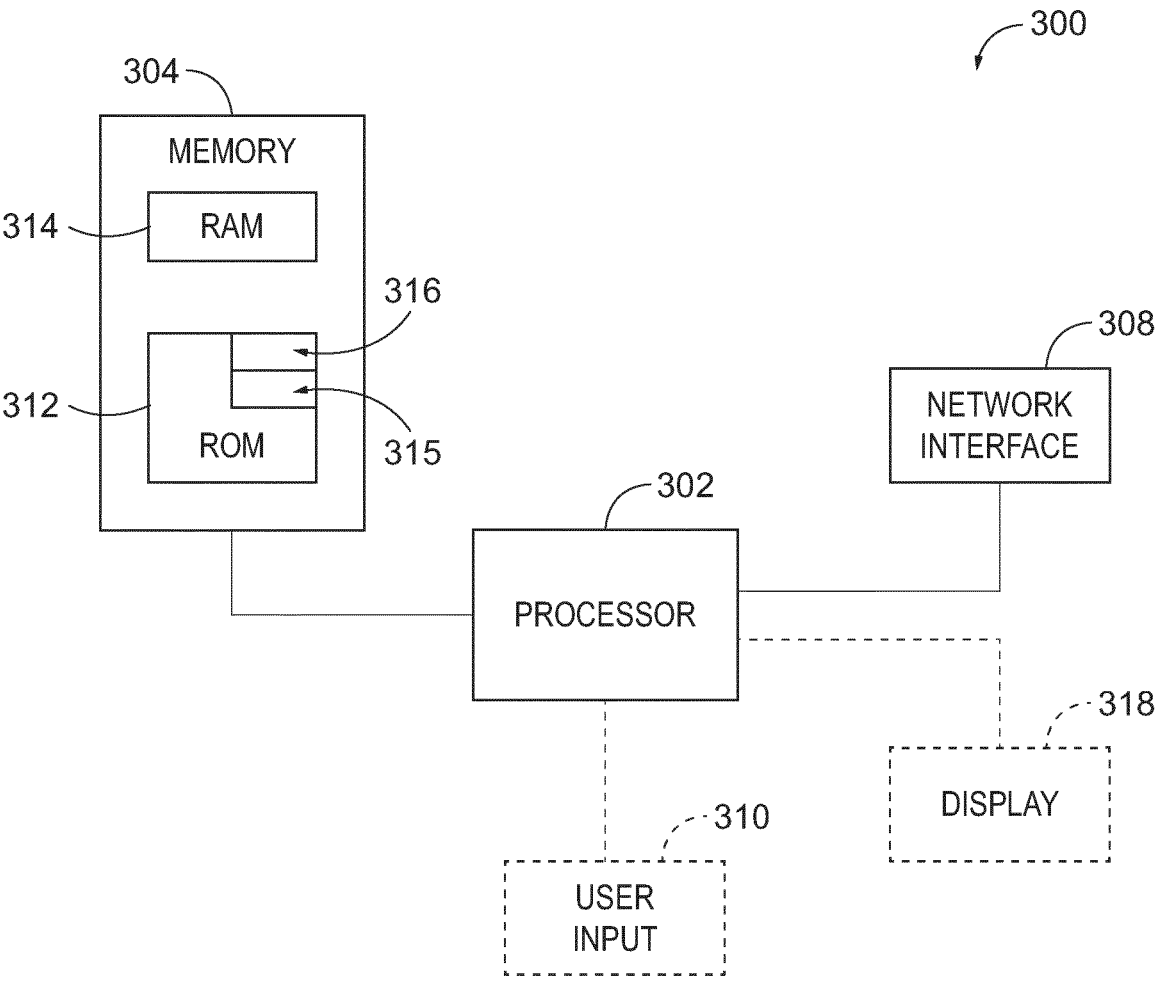
Figure 12A:
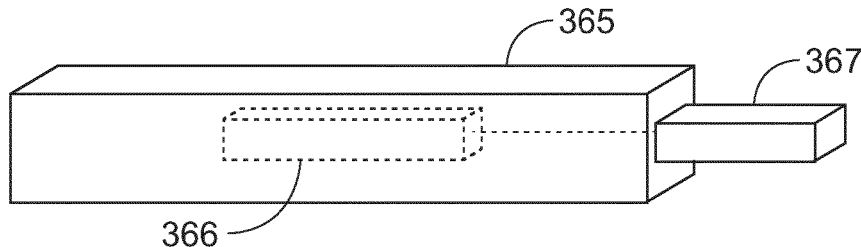
Figure 12B:
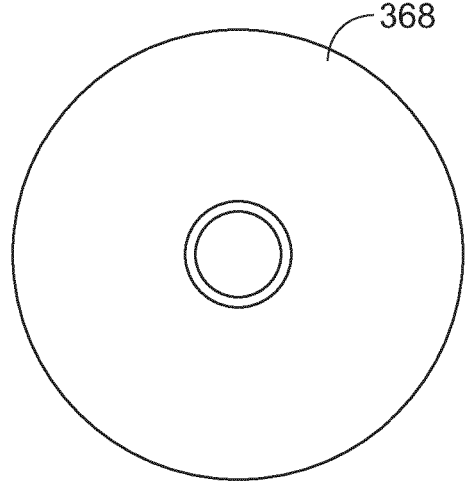

FIG. 2 shows a message sequence in accordance with an example embodiment;

FIGS. 3 and 4 are flow charts showing algorithms in accordance with example embodiments;

FIGS. 5 to 10 show message sequences in accordance with example embodiments;

FIG. 11 is a block diagram of components of a system in accordance with an example embodiment; and FIGS. 12A and 12B show tangible media, respectively a removable non-volatile memory unit and a compact disc (CD) storing computer-readable code which when run by a computer perform operations according to example embodiment.

DETAILED DESCRIPTION

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

Figure 1:
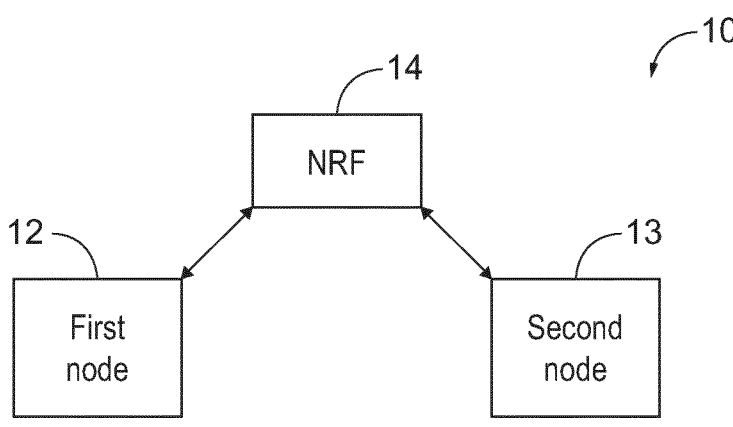
FIG. 1 is a block diagram of a system in accordance with an example embodiment.

FIG. 1 is a block diagram of a system, indicated generally by the reference numeral 10, in accordance with an example embodiment. The system 10 comprises a first node 12 and a second node 13 of a mobile communication system. Each of the first and second nodes are in two-way communication with a network repository function (NRF) 14 of the mobile communication system.

The first node 12 and/or the second node 13 may be access nodes of the mobile communication network, such as next generation radio access network (NG_RAN) nodes. Alternatively, one or both of the first and second nodes may be other 5G access network entities, such as TNGF, N3IWF, W-AGF or access network entities in other mobile and wireless communications system (such as systems beyond 5G). Alternatively, one or both of the first and second nodes may be access nodes of an earlier generation of mobile communication system such as 2G (BTS, BSC), 3G (BTS, RNC, HNB) or 4G (eNB, HeNB, HeNB GW). The network repository function 14 may be a stand-alone NRF or included in a core NRF. One of the first and second nodes 12, 13 may not be an access node, and may, for example, be a core network node (3G MSC, 3G SGSN, 4G MME, 5G AMF, 5G SMF, any 5G NF).

It may be desirable for some parameters of access nodes (such as RAN nodes) in a mobile communication system such at the system 10 to be known to other nodes (e.g. neighbouring nodes). In some example embodiments, such parameters may change infrequently (e.g. they may be semi-static) and may include cell configuration parameters (e.g. supported TAI, supported slices, supported CAG IDs, supported RAN-Based Notification Area) and/or cell status parameters updated by the node itself (e.g. parameters relating to cell load).

As described further below, Service Based Architecture (SBA) principles may be used for exchanging such information.

FIG. 2 shows a message sequence, indicated generally by the reference numeral 20, in accordance with an example embodiment. The message sequence 20 shows message between a first access node 21, a second access node 22 and a network repository function (NRF) 23 of a mobile communication system. The first access node 21, second access node 22 and NRF 23 are examples of the first node 12, second node 13 and NRF 14 described above.

The message sequence 20 starts with a first register request 25 being sent from the first access node 21 and received at the NRF 23.

The first register request 25 (such as an Nnrf_NFManagement_NFRegister service request) registers parameters or capabilities of the first node 21 in the NRF 23 to enable the NRF to provide information relating to said parameters or capabilities to another node (e.g. the second node 22) of the mobile communications system. The first register request 25 may also actually correspond to a Nnrf_NFManagement_NFUpdate that updates an actual registration Nnrf_NFManagement_NFRegister that had been carried out beforehand.

The message sequence 20 continues with a discovery request 26 being sent from the second access node 22 and received at the NRF 23. The discovery request 26 requests parameters or capabilities of the first node.

A discovery response 27 is sent from the NRF 23 to the second access node 22 (in response to the discovery request 26), providing the requested parameters or capabilities of the first node.

In some arrangements, neighbouring access nodes can discover themselves (e.g. with UE reports) and draw a direct/point-to-point interface (e.g. X2, Xn between them). For example, such access nodes may directly exchange the semi-static parameters they are interested in directly via X2(Xn) Setup and RAN Configuration Update messages. However, there are cases where such access nodes cannot or do not want to exchange information directly. Examples are:

Nodes of different generations (no direct interface between eNB and gNB, between eNB and BSC, etc.)

Nodes of same generation without direct interface (e.g. two gNBs across PLMN borders)

In another arrangement, an access node may wish to know all other access nodes that are part of the same RAN-Based Notification Area even though these other access nodes are not neighbouring access nodes.

Moreover, in a service based architecture where there is no direct point to point interface between a particular RAN node and an Access and Mobility Management Function (AMF), it may be useful to have a mechanism allowing the RAN node to be made aware of AMF parameter updates and conversely to have a mechanism allowing AMF node to be made aware of RAN node parameter updates.

FIG. 3 is a flow chart showing an algorithm, indicated generally by the reference numeral 30, in accordance with an example embodiment.

The algorithm 30 starts at operation 32 where a first register request (such as an Nnrf_NFManagement_NFRegister service request) is sent to a network repository function (NRF) of a mobile communication system to register node parameters or capabilities of a first node of the mobile communication system in the network repository function, to enable the network repository function to provide information relating to said parameters or capabilities to a second node of the mobile communications system. The first message 25 of the message sequence 20 described above in an example of such as message.

At operation 34, a register update request (such as an Nnrf_NFManagement_NFUpdate service request) is sent to the network repository function (NRF) to register updates to the first node parameters or capabilities in said network repository function, to enable the network repository function to provide information relating to said updated parameters or capabilities to a second node of the mobile communications system.

FIG. 4 is a flow chart showing an algorithm, indicated generally by the reference numeral 40, in accordance with an example embodiment.

The algorithm 40 starts at operation 42 where a subscription request is sent from a second node of a mobile communication system to a network repository function. The subscription request requests that the second node be notified about a change of parameters or capabilities of a first node of the mobile communication system.

At operation 44, a notification is received at the second node from the NRF including details of updated parameters or capabilities, as updated by the node identified in the subscription request described above.

Figure 5:
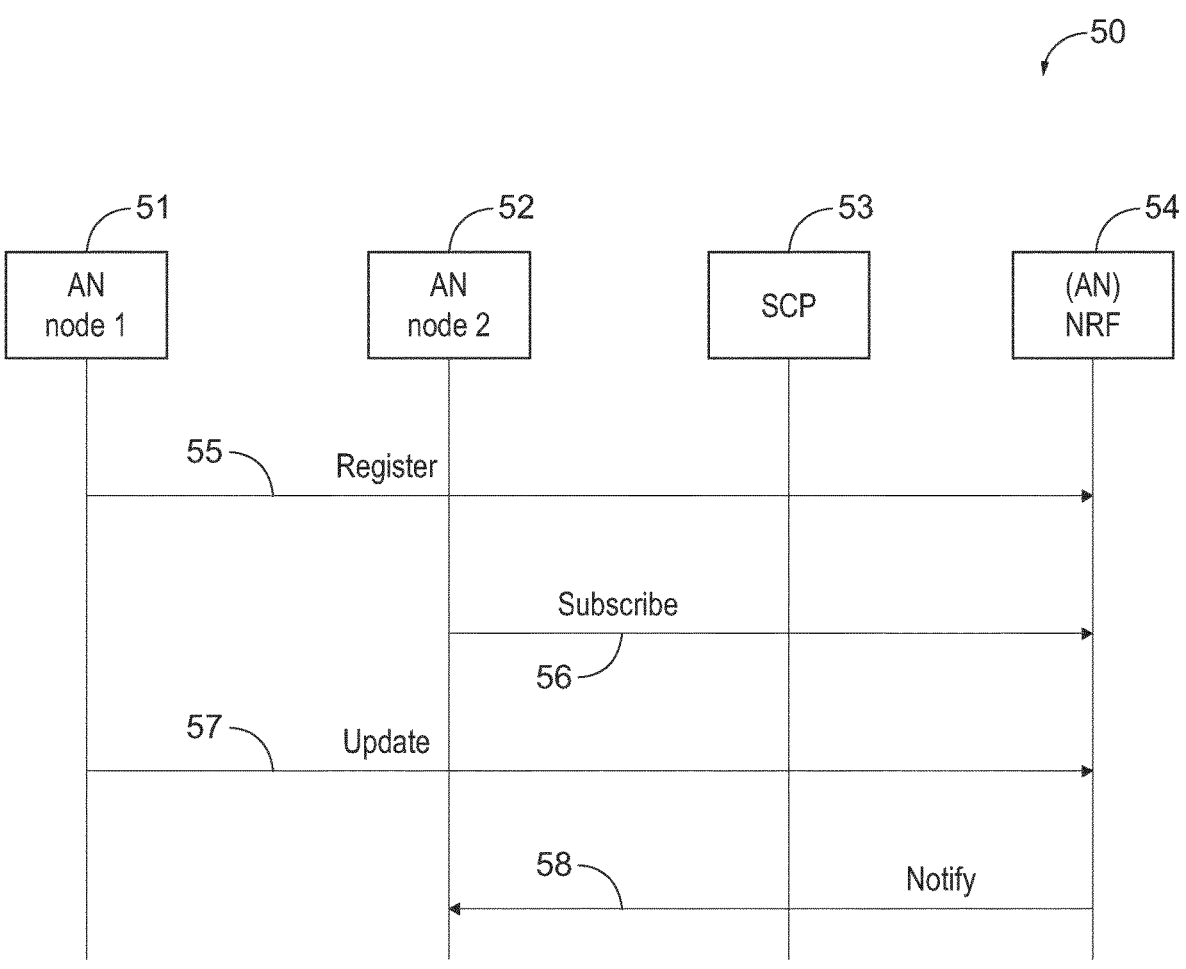

FIG. 5 shows a message sequence, indicated generally by the reference numeral 50, in accordance with an example embodiment. The message sequence 50 may be used to implement the algorithms 30 and 40 described above.

The message sequence 50 shows messages between a first access node 51, a second access node 52 and a network repository function (NRF) 54 of a mobile communication system. The mobile communication system also includes a service communication proxy (SCP) 53 that is not used in the message sequence 50.

In the message sequence 50, service based infrastructure (SBI) is leveraged to enable the access node (AN) entities to register (in an access node NRF function), semi-static access characteristics such as a list of tracking area identities (TAIs), a list of closed access group (CAG) identities, a list of RAN-Based Notification Area identities, a list of S-NS-SAI(s) etc. supported by the access node and to enable access node entities to discover such access characteristics of other access node entities and/or to subscribe to receive notifications whenever such access characteristics of other access node entities change (including, for example, receiving notifications whenever a new access node entity registers an access characteristic identified in a subscription to the access node NRF). Note that the access characteristics indicated in this and other embodiments described herein may, for example, refer to the whole access node entity (e.g. NG RAN, N3WIF, W-AGF, TNGF) or to a specific access like a cell managed by the access node entity.

The message sequence 50 starts with a first register request message 55 being sent from the first access node 51 and received at the NRF 54. The first register request message 55 may be an Nnrf_NFManagement_NFRegister service request and is an example implementation of the operation 32 described above.

In response to the message 55, the NRF 54 may register access characteristics such as the list of TAIs, list of CAG IDs, list of S-NSSAI(s) etc. supported by the cells of the first access node 51. The access characteristics indicated in the message 55 may refer to the whole access network, or to a specific cell like cell 1. This may correspond to registering: access characteristics in relation to a first cell and a list of cells (including the first cell) in relation to a particular access network. Note that the access network NRF 54 used may depend on the PLMN being supported by a particular cell.

The message sequence 50 continues with a subscription request 56 being sent from the second access node 52 to the NRF 54. The subscription request message 56 is an example implementation of the operation 42 described above. Note that a discovery request/response pair of messages, such as the discovery request 26 and discovery response 27 described above, may occur before the subscription request message 56 is sent from the second access node 52 to the NRF 54; these message may enable the second access node 52 to obtain initial values of the relevant parameters of the target resource of the first access node 51.

By way of example, the subscription request message 56 (and possibly the discovery request/response pair 26, 27) may be triggered in response to the second access node 52 detecting that a cell of the first access node 51 is a neighbour, such that the second access node 52 is interested in learning parameters such as the TAI and/or CAG IDs and/or S-NS-SAI(s) etc. supported by the cell of the first access node and any changes to the cell-supported features over time. The second access node 52 may therefore subscribe to NRF 54 to receive parameters relating to the neighbour cell and to be further notified whenever those parameters change.

Next, a register update request message 57 is sent from the first access node 51 to the NRF 54. The update request message 57 may be an Nnrf_NFManagement_NFUpdate service request and is an example implementation of the operation 34 described above.

The update message 57 may be sent, for example, in the event of a change in the list of S-NSSAI(s) supported by a cell of the first access node 51.

Finally, a notification 58 is sent from the NRF 54 to the second access node 52. The notification includes details of updated parameters or capabilities (as provided in the update request message 57) and is an example implementation of the operation 44 described above. Thus, for example, a change in the list of S-NSSAI(s) of the cell of the first access node 51 my trigger the NRF 54 to notify the second access node 52 using the message 58.

As described above, the update message 57 may be triggered by a change in the list of S-NSSAI(s) supported by a cell of the first access node 51. This is one example of triggering the use of said register update request to register update(s) to said node parameters or capabilities. Other trigger functions are possible, such as identifying one or more of: a change in the Tracking Area supported by a cell; a change in a list of network slice information; the addition or removal of a cell supported by a radio node; a change in cell load; a change in data analytics. Further details of example trigger functions are described below.

Figure 6:
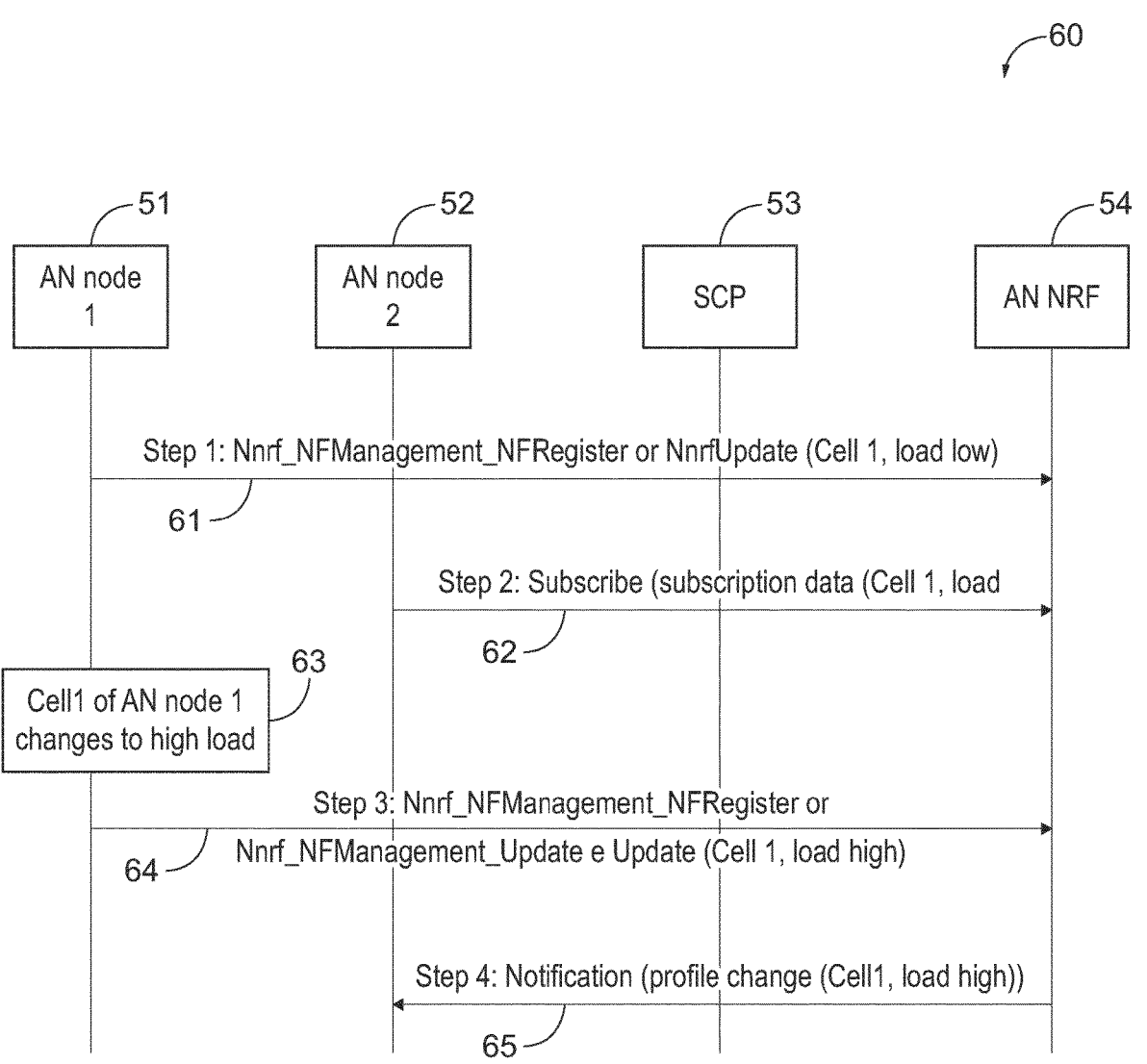

FIG. 6 shows a message sequence, indicated generally by the reference numeral 60, in accordance with an example embodiment. The message sequence 60 shows messages between the first access node 51, the second access node 52 and the network repository function (NRF) 54 described above.

In the message sequence 60, service based infrastructure (SBI) is leveraged to enable the access node entities nodes to register in an access node NRF function more dynamic but low varying cell characteristics such as cell load (e.g. low, medium, high), and to enable access node entities to discover such access characteristics of other access node entities and/or to subscribe to receive notifications whenever such access characteristics of another access entity change. In variants of the message sequence 60, the majority of the information agreed in 3GPP RAN3 Rel-16 SON-MDT work item to be exchanged periodically between NG RAN nodes over Xn and F1 are eligible for subscription and publication by the AN NRF.

The message sequence 60 starts with a first register request message 61 (similar to the message 55 described above), possibly followed by at least one registration Update Nnrf_NFManagement_NFUpdate, being sent from the first access node 51 and received at the NRF 54. As noted above, the first register request message 61 may be an Nnrf_NF- Management_NFRegister service request and is an example implementation of the operation 32 described above. The message 61 may be a function to register that the load of some of the cells of the first access node 51 have a particular load level (e.g. a low load or a high load).

The message sequence 60 continues with a subscription request 62 being sent from the second access node 52 to the NRF 54 (typically following a discovery request and response pair, as discussed above with reference to the message sequence 50). The subscription request message 62 is an example implementation of the operation 42 described above. The message 62 may be sent in response to the second access node 52 detecting that a cell of the first access node 51 is a neighbour.

In an event 63, the loading of a particular cell (cell 1 in this example) of the first access node 51 changes from a low load level to a high load level. The event 63 may be a trigger.

A register update request message 64 is sent from the first access node 51 to the NRF 54 in response to the detection of the event 63. The update request message 64 may be an Nnrf_NFManagement_NFUpdate service request and is an example implementation of the operation 34 described above.

The change of cell 1 load triggers the AN NRF to notify the second access node 52. Thus, a notification message 65 is sent from the NRF 54 to the second access node 52. The notification includes details of updated parameters or capabilities (as provided in the update request message 64) and is an example implementation of the operation 44 described above. Thus, for example, the updated cell load level may be provided in the message 65.

Figure 7:
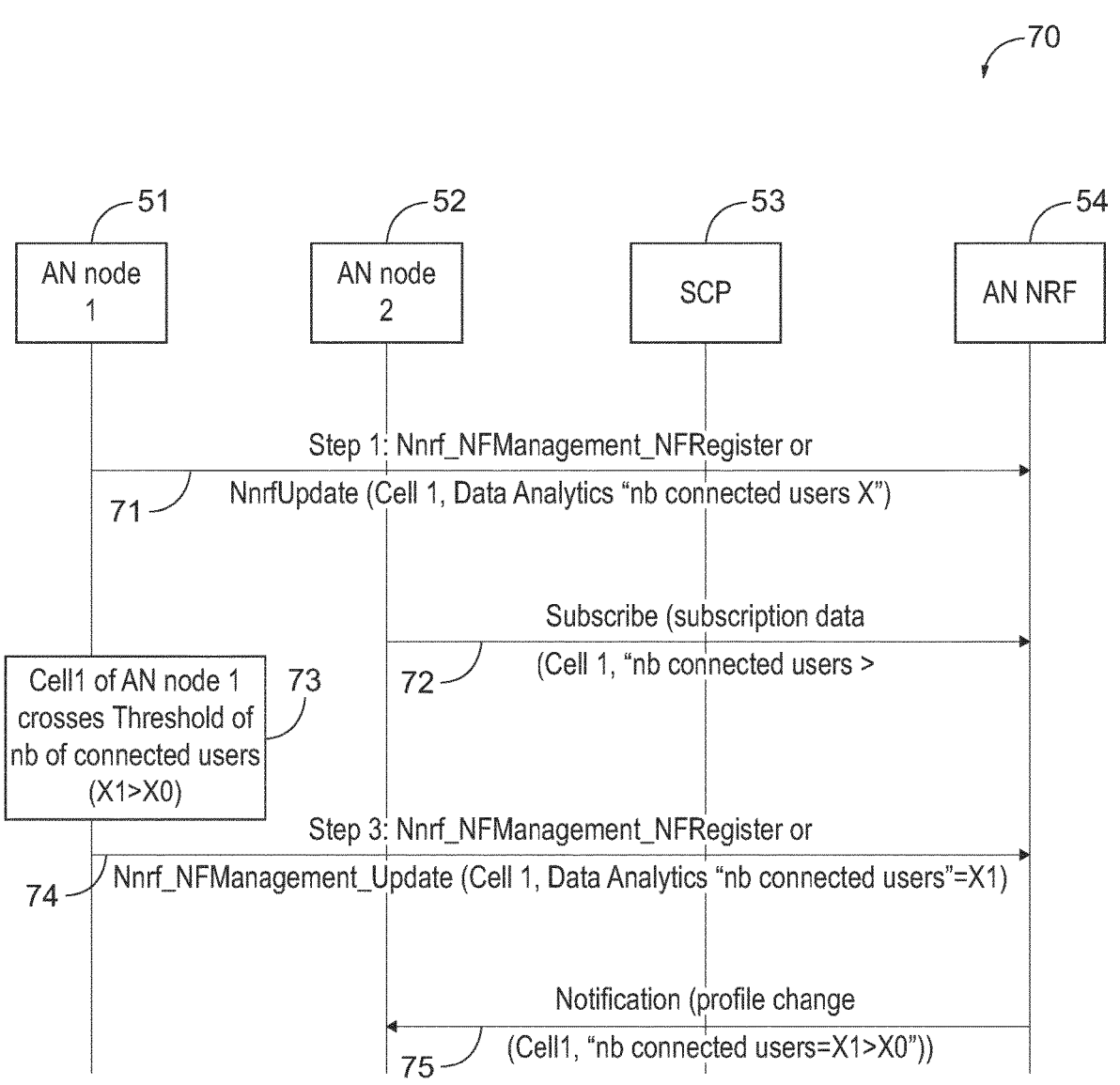

FIG. 7 shows a message sequence, indicated generally by the reference numeral 70, in accordance with an example embodiment. The message sequence 70 shows messages between the first access node 51, the second access node 52 and the network repository function (NRF) 54 described above.

In the message sequence 70, service based infrastructure (SBI) is leveraged to enable the access node entities to register data analytics concerning an access cell. Such data analytics may include an average number of connected users in a cell, although many other data analytics may be recorded in addition to, or instead of, the average number of connected users. As discussed below, other access nodes may be able to discover such access data analytics, for example using the subscription techniques described above.

The message sequence 70 starts with a first register request message 71 (similar to the messages 55 and 61 described above) being sent from the first access node 51 and received at the NRF 54. As noted above, the first register request message 71 may be an Nnrf_NFManagement_N-FRegister service request. The message 71 may be a register function to register data analytics concerning some of the cells of the first access node 51 (e.g. the average number of users in a particular cell).

The message sequence 70 continues with a subscription request 72 being sent from the second access node 52 to the NRF 54. The subscription request message 72 is an example implementation of the operation 42 described above. The message 72 may be sent in response to the second access node 52 detecting that a cell of the first access node 51 is a neighbour. The message 72 may, for example, request a notification whenever a particular data analytics measure changes. Alternatively, the message may subscribe to the NRF to be notified whenever a data point crosses a defined threshold (e.g. an average number of users crosses some threshold X0).

In an event 73, the number of connected users in a particular cell crosses a threshold (e.g. the number of users X1 rises above a threshold X0). The event 73 may be a trigger.

A register update request message 74 is sent from the first access node 51 to the NRF 54 in response to the detection of the event 73 or as part of regular updates generated by the first access node to the NRF. The update request message 74 may be an Nnrf_NFManagement_NFUpdate service request and is an example implementation of the operation 34 described above. In an alternative embodiment, the event 73 may be implemented in the NRF to trigger the AN NRF to notify the second access node 52.

A notification message 75 is sent from the NRF 54 to the second access node 52. The notification may include details of the relevant analytics data (e.g. information relating to the crossing of the threshold discussed above).

In at least some of the example embodiments described above, the first and second nodes of a mobile communication system are access nodes and the first node is a neighbour node of the second node. In at least some further example embodiments, one of the first and second nodes is an Access and Mobility Management Function of the mobile communication system, with the other node being an access node, as discussed further below.

Figure 8:
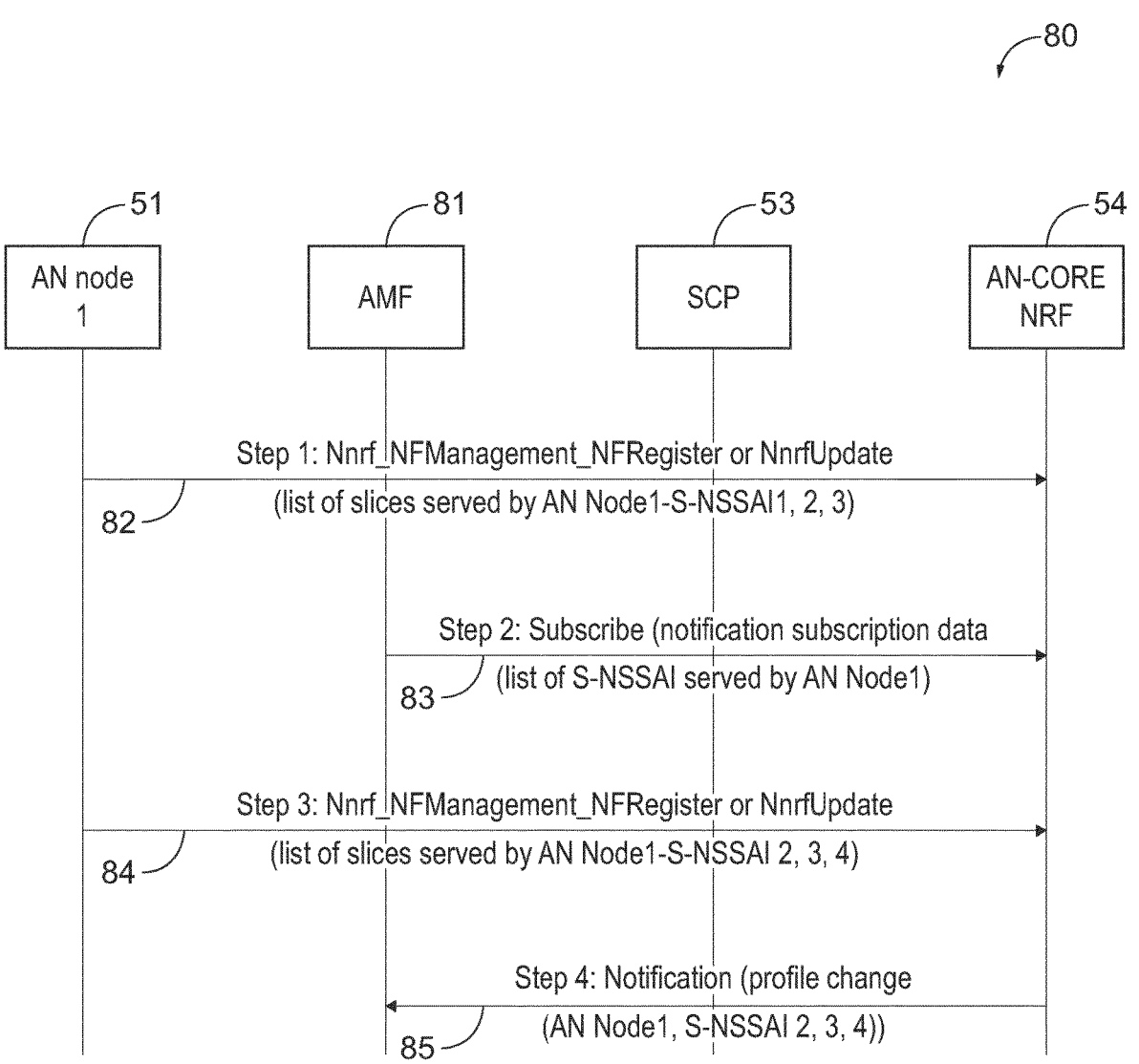

FIG. 8 shows a message sequence, indicated generally by the reference numeral 80, in accordance with an example embodiment. The message sequence 80 shows messages between the first access node 51, Access and Mobility Management Function (AMF) 81 and the network repository function (NRF) 54. As described further below, the message sequence 80 relates to access node notifications subscribed by the AMF 81.

In the message sequence 80, service based infrastructure (SBI) is leveraged to enable the AN nodes to register in a AN-Core NRF function semi-static cell, gNB, TAC, slice characteristics such as the list of slices supported by the AN node and to enable nodes in the core network (such as AMF 81) to subscribe to receive notification whenever such cell, TAC, slice, AN node characteristics of a particular AN node changes.

The message sequence 80 starts with a first register request message 82 (similar to the messages 55, 61 and 71 described above) being sent from the first access node 51 and received at the NRF 54. As noted above, the first register request message 82 may be an Nnrf_NFManagement_N-FRegister service request. The message 82 may be a register function to register a list of slices supported or a list of slices per TAC supported by the access node.

The AMF 81 may be interested to learn the list of slices supported by first access node 51 or the list of slices per TAC supported by the first access node and to learn any change of this over time. As such, the AMF 81 sends a subscription request 83 to the NRF 54. The message 83 may, for example, request a notification whenever the subscribed data changes.

A register update request message 84 is sent from the first access node 51 to the NRF 54 in the event of a change in the list of slices supported by the first access node 51. The update request message 84 may be an Nnrf_NFManagement_NFUpdate service request.

The message 84 triggers the NRF 54 to send a notification message 85 is to the AMF 81. The notification may include details of the change of slices supported by the first access node 51.

Figure 9:
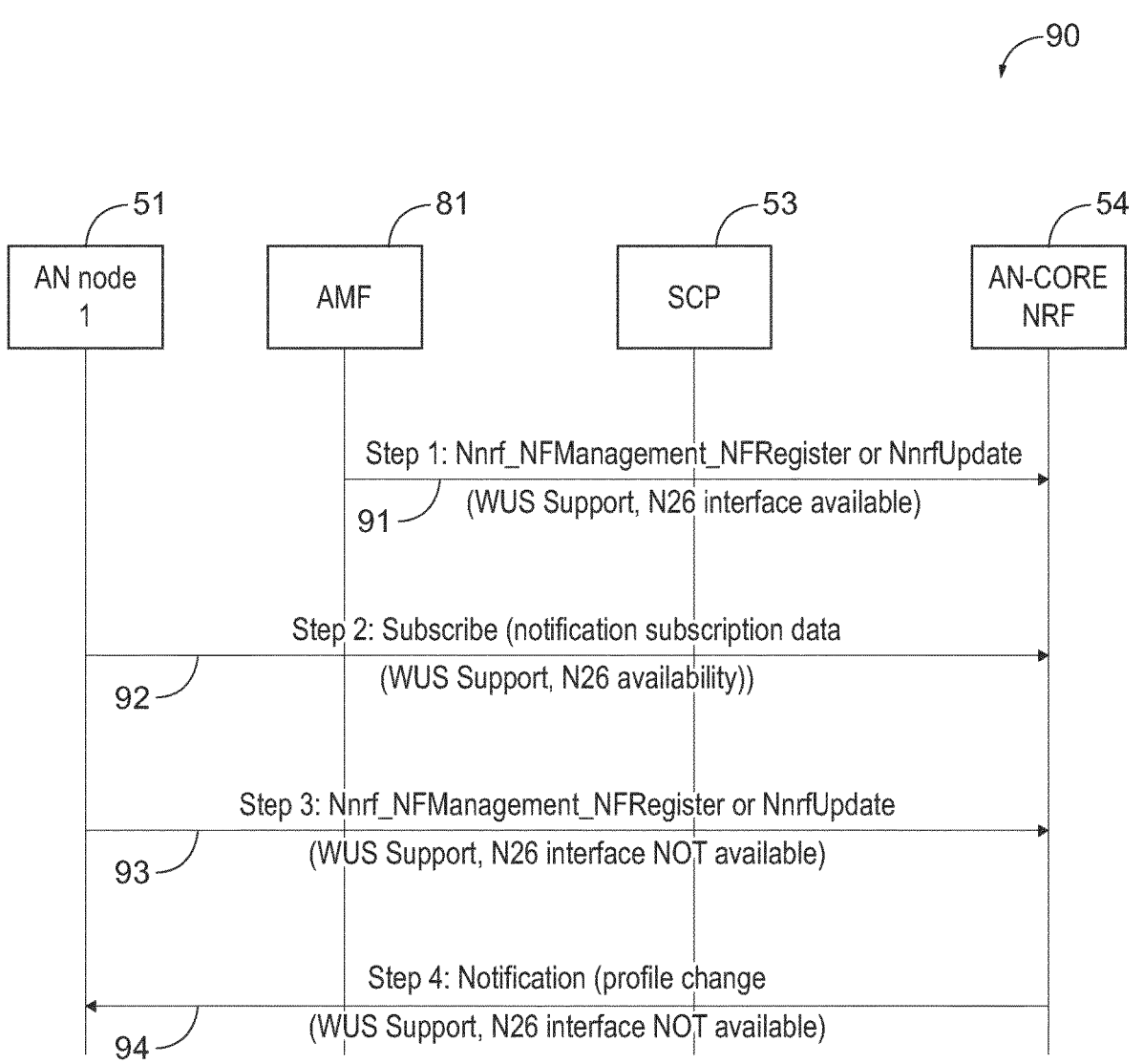

FIG. 9 shows a message sequence, indicated generally by the reference numeral 90, in accordance with an example embodiment. The message sequence 90 shows messages between the first access node 51, the Access and Mobility Management Function (AMF) 81 and the network repository function (NRF) 54 and is therefore similar to the message sequence 80. However, as described further below, the message sequence 90 relates to notifications about the capabilities of a Core entity such as the Access and Mobility Management Function (AMF) subscribed by the first access node 51.

In the message sequence 90, service based infrastructure (SBI) is leveraged to enable the AMF 81 to register in the NRF 54 characteristics such as supported features (e.g. WUS feature supported by AMF) or supported interface properties (e.g. N26 interface supported by AMF) and to enable access nodes to subscribe to receive notification whenever such AMF characteristics of a particular AMF changes The message sequence 90 starts with a first register request message 91 (similar to the messages 55, 61, 71 and 82 described above) being sent from the AMF 81 and received at the NRF 54. The first register request message 91 may be an Nnrf_NFManagement_NFRegister service request and may possibly be followed by one or more Nnrf_NFManagement_NFUpdate. The message 91 may be a register supported profile features such as WUS feature and whether an N26 interface is available.

The first access node 51 may be interested to learn whether the AMF 81 supports some features such as WUS or to learn whether N26 interface is available for that AMF and to learn any change of this over time. As such, the first access node 51 sends a subscription request 92 to the NRF 54. The message 92 may, for example, request a notification whenever the subscribed data changes. (As noted above, the message 92 may be sent after a discovery request/response paid allowing the first access node 51 to get initial values of the parameters of the AMF 81.)

A register update request message 93 is sent from the AMF 81 to the NRF 54 if defined events occur (such as a change in the availability of the N26 interface). The update request message 93 may be an Nnrf_NFManagement_N-FUpdate service request.

The message 92 triggers the NRF 54 to send a notification message 94 is to the first access node 51. The notification may include details of the change of N26 availability in AMF.

The parameters and capabilities that may be communicated as described above are examples only. Many alternatives are possible. For example, parameters and capabilities that may be communicated by an access node may include one or more of:

Supported public land mobile networks(s) and S-NPNs;
Supported tracking area identifier(s);
Supported CAG ID (closed access group identifier)(s);
Supported RAN-Based Notification Area identifiers
Supported slices or S-NSSAI (single-network slice assistance information identifier(s));
Access node characteristics;
Supported Radio Access Types;
Support of default radio parameters values such as default paging DRX value or extended DRX value or NBIOT specific DRX values;
Support of UE retention information feature;
One or more of other features supported by the access node such as Wake Up Signal, Radio Access Capability identification, control plane CIoT, user plane CIoT;
A load of one or more cells of the respective access node;
Data cell analytics;

A List of Served Cells with their supported cell parameters including any of Physical Cell ID, frequency of the cell, RAN area code of the cell, Transmission Bandwidth for the uplink and or downlink direction for the cell, Intended TDD DL-UL Configuration for the cell including the information on the split between UL and DL transmission, configured TAC indication, NPN broadcast information, SSB positions in burst, NR cell PRACH configuration, CSI-RS transmission indication. UL and DL EARFCN, offset of NBIOT channel number to DL/UL EARFCN, subframe assignment, special subframe patterns, number of antenna ports, MBSFN subframe info, E-UTRA Multiband Info List, bandwidth reduce SI, Protected E-UTRA resource indication, Broadcast PLMN List.

Other supported names for the node (e.g. O&M related names).

Example parameters or capabilities that may be provided by an AMF include one or more of:

Features supported by the Access and Mobility Management Function, including support of control plane CIoT, user plane CIoT, Wake Up Signal, UE retention information;

Ability to support of IAB nodes;

Radio access types supported by the Access and Mobility Management Function;

supported PLMNs, supported S-NPNs, supported closed access groups, supported slices or S-NSSAIs;

list of offered globally unique Access Management Identifiers;

List of other system which it can connect such as EPS, UMTS, IMS, non-3GPP networks, List of interfaces it supports including N26 interface support of the Access and Mobility Management Function; and An interface availability status of the Access and Mobility Management Function;

Other supported names for the node (e.g. O&M related names).

Figure 10:
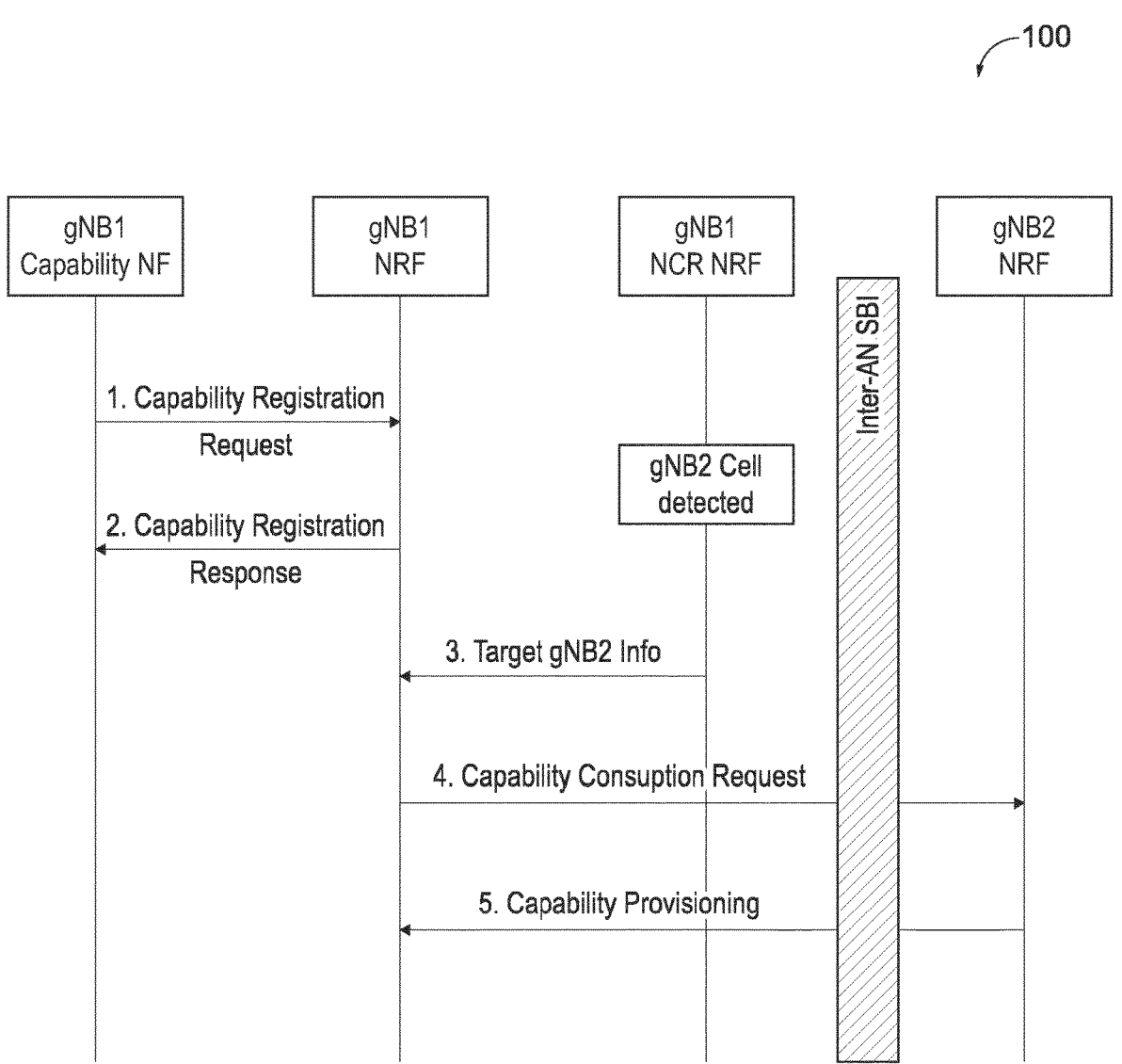

FIG. 10 shows a message sequence, indicated generally by the reference numeral 100, in accordance with an example embodiment. In the message sequence 100, some of the example embodiments described above are generalized and made more granular to enable components, e.g., network function (NFs), within one access node entity to benefit from similar services as described above from a registration and subscription towards an NRF which is, e.g., at AN node level.

It is worth noting that in the message sequences 80 and 90 described above, an AN-Core NRF, e.g., centralized one, has been exemplified to show a possible implementation aspect. A more distributed approach can also be considered, where domain-specific NRFs are utilized, e.g., AN-NRF and CN-NRF. In such a case, the domain-specific NRFs may communicate with each other for cross-domain service registration and discovery. Furthermore, SCP can also be utilized for such communications.

The message sequence 100 covers the case where AN could have lower granularity. In particular, the above-described embodiments illustrate one possible case that an AN node is realized as a single entity. In the message sequence 100, an AN entity can comprise a number of NFs, where each NF can register at an NRF, e.g., the services offered by an NF. The AN NRF can be centralized, e.g., one AN NRF for a set of AN nodes or distributed, e.g., one AN NRF per AN node. In the specific example of the message sequence 100, an AN node is exemplified as a gNB and the case of one NRF per AN node is shown. This generalization enables components within one AN node to benefit from similar services as described above from a registration and subscription towards an NRF which is at AN node level. The illustrated steps are exemplified as:

Step1/Step 2: A capability NF in the AN Node 1 (see gNB1) is configured by OAM with the information relevant for the AN node, e.g., TAIs and supported slices. Such information is registered at the corresponding gNB1 NRF. The functionality of such a capability NF can be part of the NRF, as well.

Step3: A neighbour cell relation (NCR) NF may be implemented in an AN node. This NF can be utilized to detect neighbour cells, e.g., based on the UE measurements. When a neighbour cell gNB2 is detected by the NCR NF, the NCR NF informs the gNB1 NRF with the gNB2 information, e.g., CGI.

Step 4/Step 5: The gNB1 NRF requests the information on the gNB2 via the communicating with the gNB2 NRF.

For completeness, FIG. 11 is a schematic diagram of components of one or more of the example embodiments described previously, which hereafter are referred to generically as a processing system 300. The processing system 300 may, for example, be the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms and message sequence 20, 30, 40, 50, 60, 70, 80, 90 and 100 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system

300 may be in communication with the remote server device/apparatus in order to utilize the software application stored there.

FIGS. 12A and 12B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams and message sequences of FIGS. 2 to 10 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. A mobile communication system comprising a first node, a second node and a network repository function, wherein at least one of the first node and the second node is an access node of the mobile communication system, wherein the first node comprises at least one processor and at least one memory storing instructions that, when executed by the at least one processor, cause the first node to at least perform at least one of:

sending a first register request to a network repository function of a mobile communication system to register node parameters or capabilities of a first node of the mobile communication system in the network repository function, wherein the first register request is configured to enable the network repository function to provide information relating to the node parameters or capabilities of the first node to a second node of the mobile communications system, and sending a register update request to the network repository function to register for updates of the node parameters or capabilities of the first node in said network repository function, wherein the register update request is configured to enable the network repository function to provide information relating to the node parameters or capabilities of the first node that are updated, to the second node of the mobile communications system, wherein the second node comprises at least one processor and at least one memory storing instructions that, when executed by the at least one processor, cause the apparatus to at least perform:

determining a need to at least one of get node parameters or capabilities of the first node or be notified about changes of node parameters or capabilities of the first node;

sending a subscription request from the second node to the network repository function of the mobile communication system, wherein the subscription request identifies the first node and one or more of the node parameters or capabilities of the first node, and receiving a notification from the network repository function in the event one or more of the one or more node parameters or capabilities of the first node are registered by the first node as having been updated, and wherein the network repository function comprises at least one processor and at least one memory storing instructions that, when executed by the at least one processor, cause the apparatus to at least perform:

receiving the first register request from the first node, receiving a discovery request from the second node, wherein the discovery request is configured to request to discover the node parameters or capabilities of the first node, sending a discovery response including the node parameters or capabilities of the first node to the second node, receiving a subscription request from the second node of the mobile communication system at the network repository function, wherein the subscription request is configured to request that the second node be notified about a change of the parameters or capabilities of the first node;

receiving a register update request from the first node at the network repository function, wherein the register update request is configured to register updates to the parameters or capabilities of the first node; and sending a notification to the second node in the event that at least one of the parameters or capabilities of the first node is updated.

2. An apparatus comprising:

at least one processor; and at least one memory storing instructions that, when executed by the at least one processor, cause the apparatus to at least perform:

receiving a first register request from a first node of a mobile communication system at a network repository function of a mobile communication system, wherein the first register request is configured to register parameters or capabilities of the first node in the network repository function to enable the network repository function to provide information relating to the parameters or capabilities to a second node of the mobile communications system, wherein at least one of the first node or the second node is an access node of the mobile communication system, wherein the instructions are further configured to, when the instructions are executed by the apparatus, cause the apparatus to perform:

receiving a subscription request from the second node of the mobile communication system at the network repository function, wherein the subscription request is configured to request that the second node be notified about a change of the parameters or capabilities of the first node;

receiving a register update request from the first node at the network repository function, wherein the register update request is configured to register updates to the parameters or capabilities of the first node; and sending a notification to the second node in the event that at least one of the parameters or capabilities of the first node is updated.

3. An apparatus as claimed in claim 2, wherein the instructions are further configured to, when the instructions are executed by the apparatus, cause the apparatus to perform:

receiving a discovery request from the second node of the mobile communication system at the network repository function, wherein the discovery request is configured to request to discover the parameters or capabilities of the first node; and sending a discovery response to the second node with the parameters or capabilities of the first node.

4. An apparatus as claimed in claim 2, wherein the instructions are further configured to, when the instructions are executed by the apparatus, cause the apparatus to perform: triggering the using of the register update request to register for the updates of the node parameters or capabilities of the first node, wherein the triggering the using of the register update request to register for the updates to the node parameters or capabilities of the first node comprises identifying one or more of: a change in a list of network slice information; a change in cell load; a change in data analytics; and a change in Access and Mobility Management Function characteristics.

5. An apparatus as claimed in claim 2, wherein the first node is an access node of the mobile communication system, and wherein the parameters or capabilities of the first node comprise one or more of:

supported public land mobile networks(s) and S-NPNs;
supported tracking area identifier(s);
supported CAG identifier(s);
supported slices or S-NSSAI;
access node characteristics;
supported Radio Access Types;
supported RAN-Based Notification Area;
support of default radio parameters values;
support for default paging DRX value;
support for extended DRX value;
support for NBIOT specific DRX values;
support of UE retention information feature;
support for Wake Up Signal, Radio Access Capability identification, control plane CIoT, or user plane CIoT;
a load of one or more cells of the access node;
data cell analytics;
a List of Served Cells with supported cell parameters of the list of served cells including any of the following: Physical Cell ID, frequency of the cell, RAN area code of the cell, Transmission Bandwidth for H at least one of uplink direction for the cell or downlink direction for the cell, Intended TDD DL-UL Configuration for the cell including:
information on split between UL and DL transmission, configured TAC indication, NPN broadcast information, SSB positions in burst, NR cell PRACH configuration, CSI-RS transmission indication,
UL and DL EARFCN, offset of NBIOT channel number to DL/UL EARFCN, subframe assignment, special subframe patterns, number of antenna ports, MBSFN subframe info, E-UTRA Multiband Info List, bandwidth reduce SI, Protected E-UTRA resource indication, Broadcast PLMN List; or
other supported names for the access node.

6. An apparatus as claimed in claim 2, wherein the first node is an Access and Mobility Management Function and the parameters or capabilities of the first node comprise one or more of:

features supported by the Access and Mobility Management Function, wherein the features include support of control plane CIoT, user plane CIoT, Wake Up Signal, UE retention information;
ability to support of IAB nodes;
radio access types supported by the Access and Mobility Management Function;
supported PLMNs, supported S-NPNs, supported closed access groups, supported slices or S-NSSAIs;
list of offered globally unique Access Management Identifiers;
list of other system which the Access and Mobility Management Function can connect such as EPS, UMTS, IMS, non-3GPP networks;
list of interfaces the Access and Mobility Management Function supports including N26 interface support of the Access and Mobility Management Function;
an interface availability status of the Access and Mobility Management Function;
and other supported names for the first node.

7. An apparatus comprising:

at least one processor; and at least one memory storing instructions that, when executed by the at least one processor, cause the apparatus to at least perform at least one of:

sending a first register request to a network repository function of a mobile communication system to register node parameters or capabilities of a first node of the mobile communication system in the network repository function, wherein the first register request is configured to enable the network repository function to provide information relating to the node parameters or capabilities of the first node to a second node of the mobile communications system; and sending a register update request to the network repository function to register for updates of the node parameters or capabilities of the first node in said network repository function, wherein the register update request is configured to enable the network repository function to provide information relating to the node parameters or capabilities of the first node that are updated, to the second node of the mobile communications system, wherein at least one of the first node and the second node is an access node of the mobile communication system, wherein the instructions are further configured to, when the instructions are executed by the apparatus, cause the apparatus to perform:

triggering the using of the register update request to register for the updates of the node parameters or capabilities of the first node, wherein the triggering the using of the register update request to register for the updates to the node parameters or capabilities of the first node comprises identifying: a change in a list of network slice information; a change in cell load; a change in data analytics; and a change in Access and Mobility Management Function characteristics.

8. An apparatus comprising:
at least one processor; and at least one memory storing instructions that, when executed by the at least one processor, cause the apparatus to at least perform:

sending a discovery request from a second node of a mobile communication system to a network repository function of the mobile communication system, wherein the discovery request is configured request to discover parameters or capabilities of a first node of the mobile communication system; and receiving a discovery response from the network repository function with the parameters or capabilities of the first node, wherein at least one of the first and the second node is an access node of the mobile communication system, wherein the instructions are further configured to, when the instructions are executed by the apparatus, cause the apparatus to perform:

determining a need to be notified about changes of the parameters or capabilities of the first node of the mobile communication system at a second node of the mobile communication system;

sending a subscription request from the second node to a network repository function of the mobile communication system, wherein the subscription request identifies the first node and one or more of the node parameters or capabilities; and receiving a notification from the network repository function in the event one or more of the parameters or capabilities of the first node are registered by the first node as having been updated, wherein at least one of the first and the second node is an access node of the mobile communication system.

* * * * *